United States Patent [19]
Blair et al.

[11] Patent Number: 6,005,638
[45] Date of Patent: Dec. 21, 1999

[54] FRAME AVERAGING FOR USE IN PROCESSING VIDEO DATA

[75] Inventors: Bruce A. Blair, Irvine; Morteza Parvini, San Diego, both of Calif.

[73] Assignee: Axcess, Inc., Carrollton, Tex.

[21] Appl. No.: 08/610,618

[22] Filed: Mar. 4, 1996

[51] Int. Cl.$^6$ .................................................. H04N 5/21
[52] U.S. Cl. ........................ 348/607; 348/616; 348/578
[58] Field of Search .................................. 348/607, 608, 348/613, 618, 619, 620, 621, 700, 701, 595, 597, 459, 616, 617, 578, 579; 386/2, 3, 47–50; H04N 5/21, 5/213

[56] References Cited

U.S. PATENT DOCUMENTS

| | | | |
|---|---|---|---|
| 5,010,407 | 4/1991 | Trytko | 348/578 |
| 5,202,764 | 4/1993 | Ida et al. | 348/701 |
| 5,351,084 | 9/1994 | Blair | 348/390 |
| 5,367,343 | 11/1994 | Blair | 348/700 |

*Primary Examiner*—Michael H. Lee
*Attorney, Agent, or Firm*—Gray Cary Ware & Freidenrich LLP

[57] ABSTRACT

The invention enables processing of a time-varying video image in a manner that blurs (or "smears") the time-varying portion or portions of the video image as successive frames of video data are processed. Such smearing is particularly useful in reducing the choppiness and jerkiness that degrades the viewability of the time-varying portions of a displayed video image when the frame rate is low. The invention blends corresponding video data components from a current video frame and a previous video frame to achieve the smearing effect. The invention enables the degree to which the video data from each of the frames affects the processed video data to be varied. The exact blending can be based upon, for example, the magnitude of the frame rate. Further, in processing each video frame, each of a set of related video data components can be processed serially to enable the invention to be implemented more compactly and inexpensively. The invention can be implemented in a video data capture part of a video system, a video data display part of a video system, or in both a video data capture and video data display parts. In addition to producing smearing, the invention reduces noise in the video image.

17 Claims, 3 Drawing Sheets

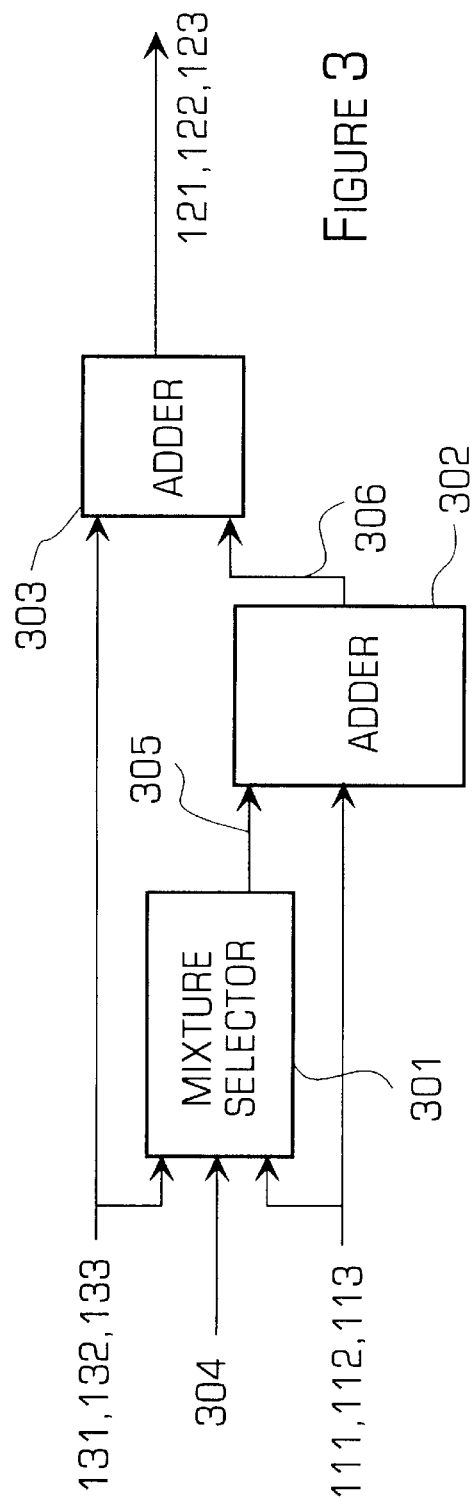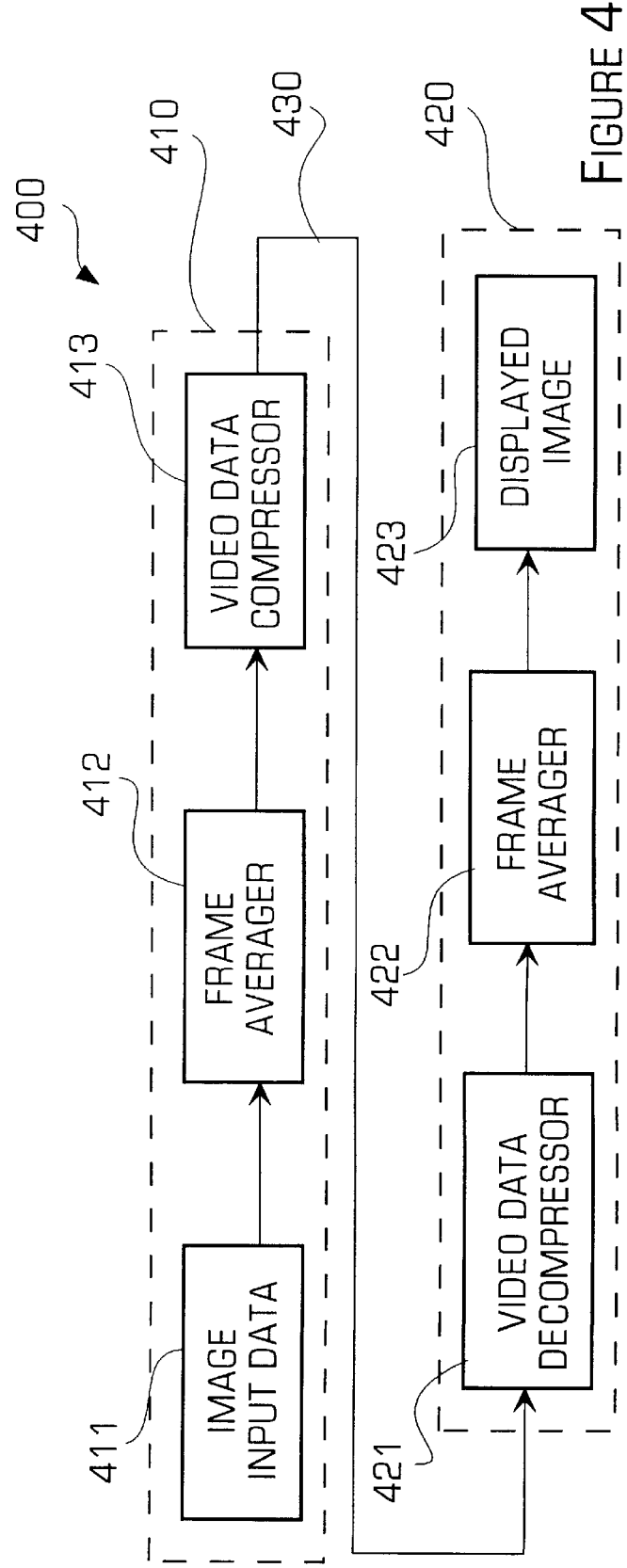

FRAME AVERAGING FOR USE IN PROCESSING VIDEO DATA

BACKGROUND OF THE INVENTION

1. Field of the Invention

This invention relates to the processing of video data and, in particular, to video data processing systems and methods, for use with low frame rate video systems, that are flexible, that can be implemented compactly and inexpensively, and that result in improved display of motion and reduced noise in the processed video data.

2. Related Art

Generally, a video display of an image including motion must be updated with new video data at or above a particular frequency in order to produce an acceptable video display. A variety of real-time video applications, such as remote surveillance and identification systems and teleconferencing systems, require real-time transmission of digital video data from one location to another and display of the data at the new location. In such systems, it has been difficult to transmit the video data (or, "image data") over conventional transmission lines (e.g., conventional telephone lines) at a rate that is fast enough to enable the video display to be updated with new video data at a rate that produces an acceptable display of moving images. The problem has been exacerbated by the representation of video images with increasingly larger amounts of data (in an effort to produce higher quality displays), since such increased amounts of video data require increased data transmission rates to update the video display with new video data at a given rate.

High speed data transmission systems, such as T1, T3 and ISDN, may be employed to address the above problem. However, high speed data transmission systems are expensive, are not available in some areas, and can be inefficient.

Data compression techniques have also been used to address the above problem by decreasing the amount of data required to represent each video image, thereby reducing the amount of video data transmitted over the transmission line and effectively increasing the data transmission rate. However, to the extent that data compression techniques are useful in solving the problem, these techniques also introduce other problems which affect the quality of the display, such as spurious random image variations that appear as noise in the displayed image. Additionally, as the incidence of motion in the image increases, the utility of data compression decreases, since the increasing presence of motion reduces the degree to which it is possible to compress the data.

Thus, notwithstanding these and other attempts to address the problem of transmitting data for real-time, full motion, remote video applications, there still exists a conflict between achievable data transmission rates and the information content required per unit of time for satisfactory video display. The problem is particularly severe when the data is transmitted over a conventional telephone line or when color video data is transmitted.

SUMMARY OF THE INVENTION

The invention enables processing of a time-varying video image in a manner that blends discontinuities between successive frames of video data (i.e., "blurs" or "smears" the time-varying portion or portions of the video image). Each frame of the video data (or, "image data") includes a multiplicity of video data components. The video data components are often grouped in related sets, such as the color components of a pixel of video data. The invention blends corresponding video data components from successive frames to achieve a smearing effect. Such smearing is useful in reducing the choppiness and jerkiness that degrades the viewability of the time-varying portions of a video image when the video data is updated at low frame rates (e.g., less than approximately 24 frames per second). The invention has been found to be particularly useful in improving the viewability of video images for frame rates less than approximately 15 frames per second. The blending of video data from successive frames also reduces the presence of noise in the video image. The invention can be advantageously used in any video system in which the rate at which the video data is updated is low, such as, for example, video systems (e.g., remote surveillance and identification systems and teleconferencing systems) in which a relatively low data transmission rate communication line (e.g., conventional telephone line) is used to transfer video data from the location at which the video data is acquired to the location of a remote video image display.

In one embodiment, successive sets of unprocessed video data signals (typically representing sets of related video data components) are input in parallel to a mechanism which serially outputs the unprocessed video data signals. A memory is used to store values representing the magnitudes of the video data components for a previous frame of video data. Each of the serially output signals are input to a current image content gain device, which amplifies the signal by a prescribed amount. Signals representing corresponding video data components of the previous frame of video data are generated from the values in the memory and serially input to a prior image content gain device, which amplifies each signal by a prescribed amount. The timing of the output of amplified signals from the current and prior image content gain devices is controlled so that signals for corresponding video data components are output at the same time. The corresponding amplified signals are input to an adder, which sums the amplified signals to produce processed video data signals for the current frame. Each of the processed video data signals are input serially to a mechanism which outputs in parallel sets of processed video data signals corresponding to the sets of unprocessed video data signals. The processed video data signals are also used to update the corresponding values in the memory for the video data components of the previous frame of video data. Preferably, the above-described devices are each implemented in a field programmable gate array. As discussed above, the system produces a smearing effect that beneficially affects the appearance of a video image that is updated at low frame rates. This embodiment of the invention is particularly useful where each frame of video data includes sets of related video data components, such as the color components of the pixels in each frame of video data of a color video image. Further, since the system according to this embodiment of the invention processes sets of video data signals serially, rather than in parallel, only one memory, one current image content gain device, one prior image content gain device, and one adder are required, rather than one set of those devices for each of the signals of a set of video data signals that are processed in parallel. This embodiment of the invention thus enables a system according to the invention to be embodied in a more compact and inexpensive manner than would otherwise be the case.

In another embodiment, a system according to the invention includes a mechanism for acquiring frames of input video data, a frame averaging device and a mechanism for transmitting signals to a video display system. The mechanism for acquiring frames of input video data can be video data acquisition apparatus for directly obtaining the input video data (e.g., apparatus for filming the image) or apparatus for ascertaining the values of pre-existing input video data (e.g., apparatus for reading the data from a memory). The frame averaging device generates signals representing weighted averages of the values of corresponding video data components from a currently acquired frame of input video data and a previous frame of input video data (the frame averaging device performs frame averaging on the input video data). These signals can be compressed by a video data compressor or not, as desired, before being transmitted to a video display system. The frame averaging both reduces noise in the video data and reduces the difference between successive frames of processed video data so that, when the video data compressor is used to compress selected successive frames of processed video data, the amount of compressed data produced by the video data compressor is reduced. Since the amount of compressed data is reduced, the effective rate at which frames of video data can be transmitted over a communication line is increased. The frame averaging also introduces a smearing effect that, as described above, beneficially affects the appearance of a video image that is updated at low frame rates. In a further embodiment, a system as above further includes a mechanism for receiving the signals transmitted by the mechanism for transmitting, a second frame averaging device, and a display device for displaying the video image. If the signals were compressed, then the system also includes a video data decompressor for decompressing the compressed signals. The second frame averaging device uses the transmitted signals to generate signals representing a weighted average of the video data components corresponding to the transmitted signals and corresponding video data components from a previously displayed frame (the second frame averaging device performs a second frame averaging of the video data). These signals, representing twice adjusted values of the video data components, are then displayed by the display device. This second frame averaging reduces noise in the video data that can, for example, be introduced by the decompression process, resulting in increased fidelity of the displayed video image. The second frame averaging also produces beneficial smearing, as described above.

In another embodiment of the invention, the values of the magnitudes of one or more video data components of a current frame of unprocessed video data and the corresponding video data components of a previous frame of video data are determined. Weighted averages of the values of corresponding video data components from the current frame and previous frame are calculated. The weights associated with the current frame and previous frame can vary according to a predefined instruction. The weights can be based upon, for example, the magnitude of the frame rate. In particular, for frame rates less than or equal to approximately 5 frames per second, the weighted average can be determined by adding 0.75 of the magnitude of the video data component from the previous frame to 0.25 of the magnitude of the video data component from the current frame. For frame rates greater than approximately 5 frames per second and less than or equal to approximately 24 frames per second, the weighted average can be determined by adding 0.5 of the magnitude of the video data component from the previous frame to 0.5 of the magnitude of the video data component from the current frame. Once calculated, the weighted averages can be used to generate a current frame of processed video data. The ability to vary the weighting of the current frame of unprocessed video data and previous frame of video data is advantageous in that only that amount of smearing that is necessary to produce an acceptable video image is generated, so that the processed video data can be maintained as close as possible to the unprocessed video data while still achieving an acceptable video image through the use of smearing.

BRIEF DESCRIPTION OF THE DRAWINGS

FIG. 3 is a block diagram of one implementation of apparatus for enabling selection of relative weights of a current frame of unprocessed video data and a previous frame of video data.

FIG. 4 is a block diagram of a system according to the invention for obtaining and displaying video data.

DETAILED DESCRIPTION OF EMBODIMENTS OF THE INVENTION

The invention blends corresponding video data components from successive frames of video data to achieve a smearing effect (i.e., the time-varying portion or portions of the video image are blurred), thereby reducing the choppiness and jerkiness that otherwise degrades the viewability of the video image when low frame rates (e.g., less than approximately 24 frames per second) are used. The blending of data from successive frames also reduces the presence of noise in the video image. The exact blending can be varied in a desired manner, e.g., the blending can be varied in accordance with the magnitude of the frame rate. Where the video data includes sets of related video data components, the related video data components can be processed serially to reduce the amount of circuitry used to implement the invention and, therefore, reduce the cost of the implementation. The invention can be implemented in either or both of a video data capture part or a video data display part of a video system.

Figure 1:
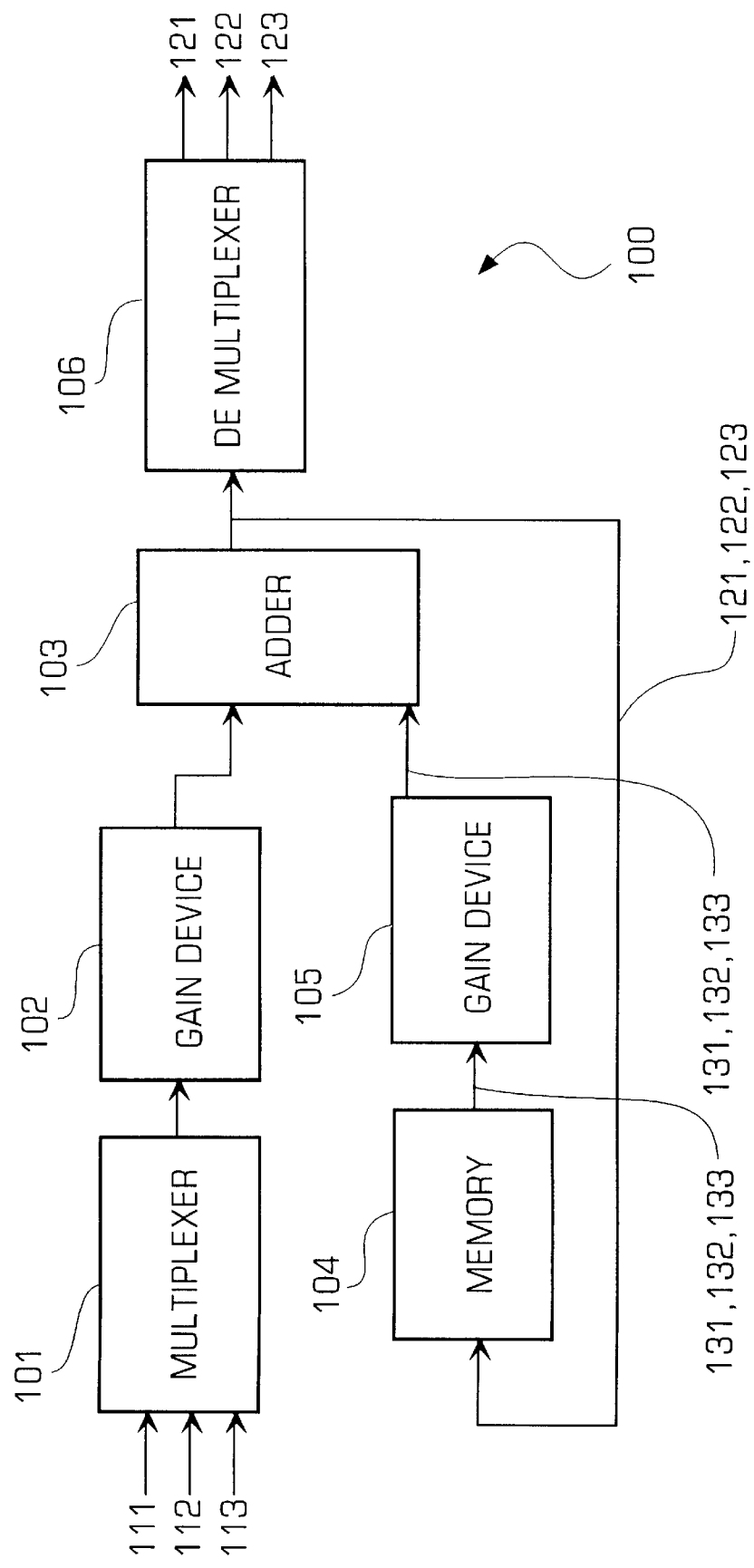
FIG. 1 is a block diagram of a frame averaging system according to the invention.

FIG. 1 is a block diagram of a system 100 according to the invention for use in processing a video image including one or more portions that change with time. The system 100 blends the content of a current frame of video data with the corresponding content of a previous frame of video data. (Herein, a "frame of video data" is a set of video data that is used to completely describe the video image. A related term, "field of video data," is used herein to describe a set of video data that represents a defined portion—usually one half—of a frame of video data.) The blending causes the time-varying portion or portions of successive frames of the video image to be blurred ("smeared"). The smearing is useful in reducing the choppiness and jerkiness that otherwise degrades the viewability of the time-varying portions of a video image when low frame rates are used. (Herein, "frame rate" refers to the rate at which new frames of video data are presented to either a video capture part or a video display part of a video display system. This is different than the display "refresh rate" at which a display device re-generates the display, which typically has a magnitude such as 30 frames per second (i.e., 60 fields per second)). Such low frame rates occur, for example, in video systems in which a relatively low transmission rate communication line (e.g., a conventional telephone line which, for example, typically transmits video data at a frame rate that is less than 10 frames per second) is used to transfer video data from the location at which the video data is acquired to the location of a remote video display. Low frame rate video systems in which the system 100 can advantageously be used include, for example, remote surveillance systems such as can be used for security monitoring (e.g., monitoring of stores or restricted areas), monitoring of areas dangerous to humans (e.g., radioactive areas in nuclear power plants, hazardous waste areas, underwater locations) or monitoring of suspected criminal activities. Low frame rate video systems can also include video teleconferencing systems.

The system 100 includes a multiplexer 101, a current image content gain device 102, an adder 103, a memory 104, a prior image content gain device 105, and a demultiplexer 106. The system 100 receives successive sets of a multiplicity of (typically related) video data input signals 111, 112, 113 and produces corresponding sets of video data output signals 121, 122, 123. As discussed in more detail below, the input signals 111, 112, 113 can be input video data (i.e., the system 100 is implemented as part of a video data capture part of a video system) or the input signals 111, 112, 113 can be video data that has been transmitted over a communication line (i.e., the system 100 is implemented as part of a video data display part of a video system). Each set of video data input signals 111, 112, 113 (and corresponding set of video data output signals 121, 122, 123) can represent, for example, color component video data for a single pixel of a video image. Such three-component color video data can be of any type, such as RGB; luminance, R-Y, and B-Y; or luminance, saturation, and hue.

Though three video data input signals 111, 112, 113 and video data output signals 121, 122, 123 are shown in FIG. 1, two, four or more video data signals can be processed by the system 100. For example, four video data input and output signals would be used when the invention is used to process four-component color video data.

The input signals 111, 112, 113 are input in parallel to the multiplexer 101 and output serially for further processing using the gain devices 102 and 105, adder 103 and memory 104. The multiplexer 101 operates according to conventional multiplexing techniques. In a preferred embodiment, the multiplexer 101 is embodied in a field programmable gate array (FPGA), such as a Xilinx™ XC3190-5 or XC3195-5, that is appropriately programmed to accomplish multiplexing of the video data input signals 111, 112, 113.

The multiplexing is accomplished, as known by those skilled in the art, using a clock (processor clock) signal and a multiplicity of control signals to cause the appropriate signals to be supplied to and from the gain devices 102 and 105, adder 103 and memory 104. In one embodiment of the invention, the processor clock (one input signal 111, 112 or 113 is processed for each processor clock cycle) has a clock rate that is four times the clock rate of the pixel clock (one set of input signals 111, 112 and 113 is presented for processing for each pixel clock cycle). Thus, during each pixel clock cycle, four processor clock cycles occur: one for each input signal and one idle cycle. Since, in the system 100, the idle processor clock cycle is not necessary to process video data, that clock cycle may be used for other purposes if desired. For example, the idle clock cycle might be used to process audio data associated with the video image.

As indicated, the input signals 111, 112, 113 are output serially from the multiplexer 101 for further processing using the gain devices 102 and 105, adder 103 and memory 104. In previous frame averaging systems, multiple related video data input signals have been processed in parallel, each video data input signal requiring a corresponding set of devices (e.g., gain devices such as the gain devices 102 and 105, memory such as the memory 104, and adder such as the adder 103) to accomplish the frame averaging for that signal. As can be appreciated from FIG. 1, since the input signals 111, 112, 113 are processed serially in the system 100, the system 100 requires only one set of devices (i.e., gain devices 102 and 105, memory 104 and adder 103), rather than three sets of those devices, as would be required if the input signals 111, 112, 113 were processed in parallel. Thus, the system 100 requires fewer devices than previous frame averaging systems and can be implemented (whether on a single integrated circuit chip or in discrete electronic components) more compactly and cheaply than can previous frame averaging systems. The additional size and cost associated with the addition of the multiplexer 101 and demultiplexer 106 to the system 100 is outweighed by the reduced size and cost associated with the elimination of the two extra sets of gain devices, adder and memory. Further, there is no detrimental loss of processing speed associated with serial processing rather than parallel processing because in either case the processing speed (i.e., rate at which current and previous frames of video data are averaged) is greater than the speed (i.e., frame rate) at which the signals need be processed.

Each of the input signals 111, 112, 113 is processed similarly by the gain devices 102 and 105, adder 103 and memory 104. Therefore, hereafter, only processing of the input signal 111 will be described; it is to be understood that processing of the input signals 112 and 113 occurs in the same manner.

The input signal 111 is input to a current image content gain device 102. As indicated above, a control signal together with a processor clock signal controls the exact time at which the input signal 111 is presented to the gain device 102 so that the processing of the input signal 111 is properly synchronized with the operation of the remainder of the system 100, as described in more detail below. The gain device 102 modulates (amplifies) the magnitude of the input signal 111 in a predetermined manner, as explained in more detail below. The gain device 102 can be embodied by a conventional multiplier constructed to yield the desired amplification. In a preferred embodiment, the gain device 102 is implemented in an FPGA (e.g., one of the above-mentioned Xilinx™ FPGAs) that is appropriately programmed to accomplish the desired amplification of the input signal 111.

The amplified input signal 111 is then input to a conventional adder 103. The adder 103 combines the amplified input signal 111 with another amplified signal 131, produced as described below, output by the prior image content gain device 105. The amplified signal 131 represents the video data component from a previous video frame that corresponds to the video data component of the current video frame represented by the input signal 111. The adder 103 outputs the output signal 121 as the sum of the amplified signals 111 and 131. The video data output signal 121, then, represents a weighted average of the video data components from the current frame of unprocessed video data and the immediately previous frame of video data. The video data components from the previous video frame can be weighted averages including video data components from an even earlier video frame or frames, so that successively produced video data output signals 121 include contributions from each of a multiplicity of earlier video frames, the contributions from a particular video frame becoming progressively smaller as more video frames are processed. In a preferred embodiment, the adder 103 is implemented in an FPGA (e.g., one of the above-mentioned Xilinx™ FPGAs) that is appropriately programmed to accomplish addition of the amplified signals 111 and 131.

The output signal 121 from the adder 103 is input to the demultiplexer 106, which, in turn, presents the output signal 121 to an output device (not shown). The output device can be, for example, a display device such as a television screen or computer display. As will be apparent from the description of FIG. 4 below, the output signals 121, 122, 123 can also be sent to other devices that, within the meaning of the term here, are "output devices." For example, the output device can be a data compressor or a transmission line. The demultiplexer 106 ensures that the output signals 121, 122, 123 are output at proper times, i.e., that the output device "knows" which video data component is being presented at any given time. The demultiplexer 106 operates according to conventional demultiplexing techniques, using the processor clock and control signals to appropriately regulate the output of the output signals 121, 122, 123 from the demultiplexer 106. In a preferred embodiment, the demultiplexer 106 is embodied in an FPGA (e.g., one of the above-mentioned Xilinx™ FPGAs) that is appropriately programmed to accomplish demultiplexing of the multiple video data output signals.

In addition to being sent through the demultiplexer 106 to an output device, the output signal 121 is also transmitted to a memory 104 which stores information representing the magnitude of the output signal 121. The processor clock signal and a control signal regulate write access to the memory 104 to ensure that the memory 104 appropriately stores the magnitudes of the output signals 121, 122, 123. During the idle processor clock cycle, writing to the memory 104 is disabled if that processor clock cycle is not being used to process useful data (e.g., audio data).

The memory 104 is preferably a field memory, which is a sequential access memory. Sequential access memories are advantageously used in systems in which continuous serial access is made to the memory by the system. Since continuous serial operation is characteristic of the system 100, implementation of the memory 104 with a field memory is beneficial. Since a field memory is a sequential access memory, the memory does not require memory addressing. Memories (e.g., random access memories) that do require memory addressing are more expensive and complicated to implement in the system 100; for these reasons, while such memories could be used to implement the memory 104, they are disfavored in comparison to a sequential access memory. Illustratively, the memory 104 can be implemented with a field memory made by Texas Instruments and having part number TMF4C1050, or a field memory made by NEC of Japan and having part number M518221.

Each time that the amplified input signal 111 is presented to the adder 103, the memory 104 is accessed and the corresponding signal 131 is generated representing the magnitude of the output signal 121 for the corresponding video data component of the previously processed frame. Similar signals 132 and 133 are generated for the corresponding output signals 122 and 123. The proper timing of the generation of each of the signals 131, 132, 133 is governed by the processor clock and control signals. If useful data is not being processed during the idle processor clock cycle, then read access to the memory 104 is disabled during that cycle. The signal 131 is input to the prior image content gain device 105, which modulates (amplifies) the magnitude of the signal 131 in a predetermined manner, as explained in more detail below. The amplified signal 131 is then combined with amplified input signal 111 in the adder 103, as described above.

In one embodiment of the invention (see, e.g., FIG. 3 below), the amplification of the gain devices 102 and 105 can be varied to alter the mixture of the video data components from the current video frame and the previous video frame that is used to produce the processed current video frame. The variation in the amplification of the gain devices 102 and 105 is coordinated so that the sum of the amplifications is equal to 1.

As described above, in a preferred embodiment, the multiplexer 101, gain devices 102 and 105, adder 103 and demultiplexer 106 are each implemented in an FPGA. Typically, all of the components are implemented in a single FPGA, though, strictly speaking, this is not necessary. Additionally, each of the multiplexer 101, gain devices 102 and 105, adder 103 and demultiplexer 106 can be implemented as discrete electronic components in a manner known by those skilled in the art.

Figure 2:
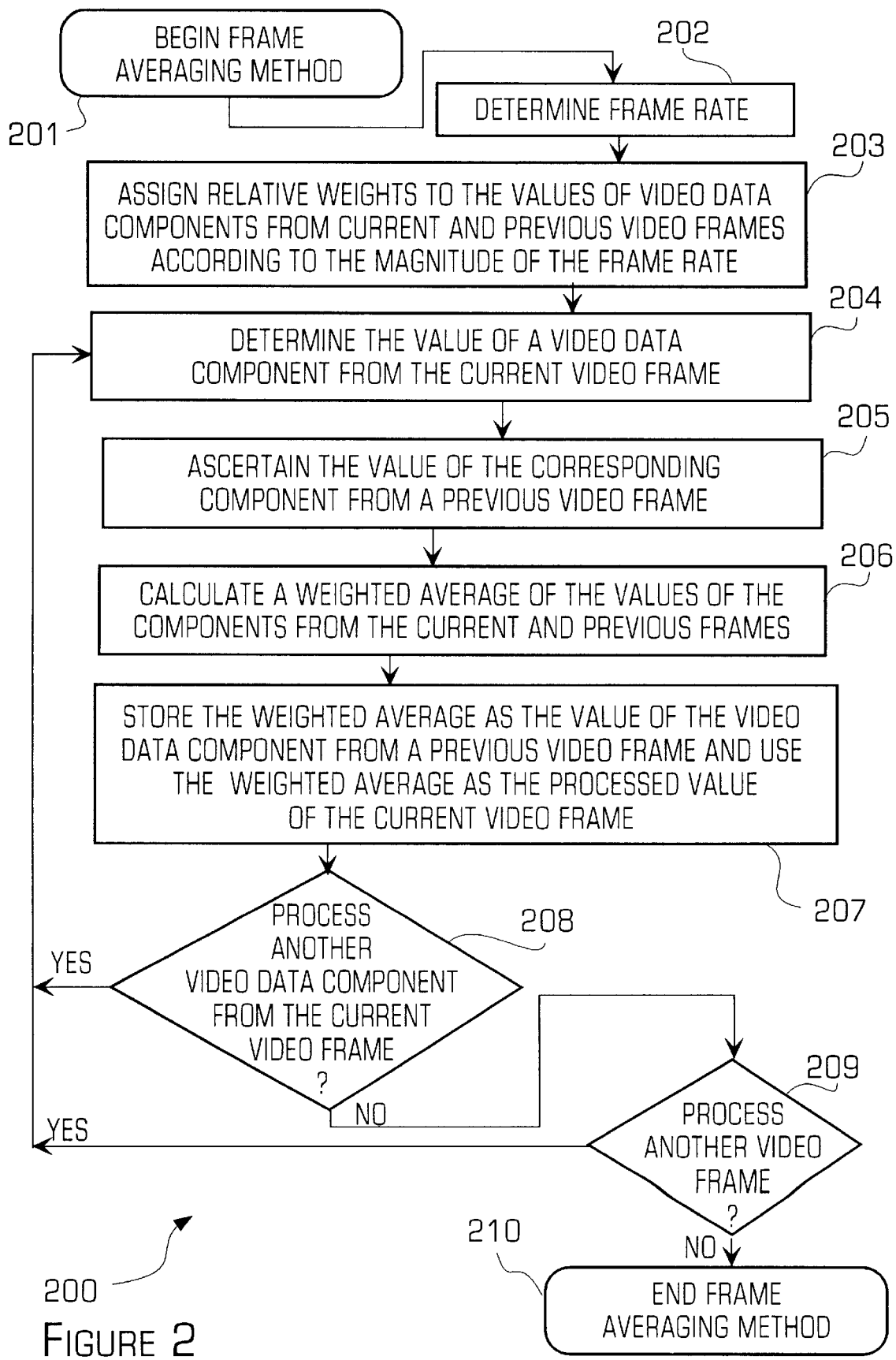
FIG. 2 is a flow chart of a frame averaging method according to the invention.

FIG. 2 is a flow chart of a frame averaging method 200 according to the invention. The method 200 combines the content of a current video frame (i.e., current frame of unprocessed video data) with the content of a previous video frame (i.e., previous frame of video data, which often will be a frame of previously processed video data) according to a user-specified weighting of the content of the current and previous video frames. The method 200 can be implemented, for example, by the system 100 of FIG. 1. However, the method 200 can also be implemented in other apparatus: for example, a system similar to system 100 that eliminates the multiplexer 101 and demultiplexer 106 of the system 100 and processes the input signals 111, 112, 113 in parallel using three sets of gain devices, adder and memory. The method 200 is applicable to either monochrome or color video data.

The beginning of the frame averaging method 200 is indicated by 201 in FIG. 2. In step 202, the frame rate is determined. Again, the frame rate, as used herein, is the rate at which new frames of video data are presented to either a video capture part or a video display part of a video display system. The frame rate can be determined automatically by a system according to the invention or can be pre-specified by a user based upon knowledge that the user has of the video system with which the method 200 is to be used. The frame rate could be determined automatically by, for example, identifying the beginning of each frame of video data and using a timer and clock to measure the time between beginnings of successive frames, using techniques known by those skilled in the art, thereby enabling determination of the frame rate. As previously indicated, generally, the method 200 is used in video systems in which the frame rate is low, e.g., less than approximately 24 frames per second. The invention is particularly useful for video systems in which the frame rate is less than approximately 15 frames per second.

In step 203, the weights associated with the current and previous video frames are assigned. Each of the weights is a number between 0 and 1 that reflects the degree of influence upon the processed content of a current video frame that the measured content of the current video frame and the content of the immediately previous video frame will have. The sum of the weights must total one. If the sum of the weights is other than one, then the appearance of the display of the processed video becomes unacceptable. For example, if the sum of the weights is greater than one, then the displayed image will gradually turn all white.

In the method 200, the weights are determined based upon the magnitude of the frame rate. (In other embodiments of the invention, the weights can be determined without regard to the magnitude of the frame rate.) As the frame rate decreases, the amount of smearing necessary to create an acceptable video image increases. As the weight of the previous video frame is increased relative to the weight of the current video frame, the amount of smearing increases. Thus, in the method 200, it is generally desirable to increase the weight of the previous video frame as the frame rate decreases. Though any relative weights may be chosen, it is believed preferable to choose weights such that between approximately 50% and 75% of the content of the previous video frame is used. Using more than approximately 75% of the content of the previous video frame creates so much of a smearing effect that the smearing becomes annoying. Using less than approximately 50% of the content of the previous video frame does not create enough smearing to adequately overcome the jerky motion attendant low frame rates.

Generally, any number of sets of relative weights can be specified. It is desirable to specify more sets of relative weights to enable the relative weights to be more closely tailored to a particular frame rate. However, each additional set of relative weights makes the physical implementation of the option to choose weights correspondingly more complex, space consuming and costly. In a particular embodiment of the method 200, one of two sets of relative weights can be chosen. For frame rates less than or equal to approximately 5 frames per second, the weight associated with the previous video frame is 0.75 and the weight associated with the current video frame is 0.25, while for frame rates between approximately 5 frames per second and approximately 24 frames per second, the weight associated with the previous video frame is 0.5 and the weight associated with the current video frame is 0.5.

FIG. 3 is a block diagram of one implementation of apparatus 300 for enabling selection of relative weights associated with a current video frame and a previous video frame. The apparatus 300 includes a mixture selector 301 and two adders 302 and 303. The mixture selector 301 and adders 302 and 303 can be incorporated into the system 100 of FIG. 1, replacing the current image content gain device 102, adder 103, and prior image content gain device 105.

One of the input signals 111, 112, 113, a corresponding one of the signals 131, 132, 133, and a mixture select signal 304 are input to the mixture selector 301. (Though not shown, the processor clock and control signals discussed above, are applied to each of the mixture selector 301 and adders 302 and 303 to ensure that the input signals 111, 112, 113 and the corresponding signals 131, 132, 133 are properly synchronized with respect to each other. Hereafter, the operation of the apparatus 300 will be described only for the processing of the input signal 111 and corresponding signal 131; the operation is the same with respect to the other input signals 112 and 113, and the corresponding signals 132 and 133.) According to the value of the mixture select signal 304, either the input signal 111 (representing the measured value of video component data from the current video frame) or the signal 131 (representing the value of the corresponding video component data from the previous video frame) is selected and is output as the signal 305 from the mixture selector 301. The mixture selector 301 can be embodied by, for example, conventional 2:1 multiplexing circuitry.

The signal 305 and the input signal 111 are input to the adder 302. The adder 302 sums the magnitudes of the signal 305 and the input signal 111, divides the result by two, and outputs the result as the signal 306. The signal 306 and the signal 131 are input to the adder 303. The adder 303 sums the magnitudes of the signal 306 and the signal 131, divides the result by two, and outputs the result as the output signal 121. The adders 302 and 303 can both be embodied by conventional circuitry that accomplishes the desired functionality (or in the above-described Xilinx™ FPGA).

If, then, the magnitude of the signal 305 is equal to the magnitude of the input signal 111, then the magnitude of the signal 306 is equal to the magnitude of the input signal 111. The magnitude of the output signal 121 produced by the adder 303 will be, then, equal to one half the magnitude of the input signal 111 plus one half the magnitude of the signal 131, i.e., a mixture of 50% of the content of the current video frame and 50% of the content of the previous video frame is produced.

If the magnitude of the signal 305 is equal to the magnitude of the signal 131, then the magnitude of the signal 306 is equal to one half the magnitude of the input signal 111 plus one half the magnitude of the signal 131. The magnitude of the output signal 121 produced by the adder 303 will be, then, equal to one quarter the magnitude of the input signal 111 plus three quarters the magnitude of the signal 131, i.e., a mixture of 25% of the content of the current video frame and 75% of the content of the previous video frame is produced.

Alternatively, rather than the apparatus 300 of FIG. 3, a digital video mixer can be used to enable selection of relative weights associated with the current and previous video frames. The digital video mixer can be incorporated into the system 100 of FIG. 1, replacing the current image content gain device 102, adder 103 and prior image content gain device 105. The digital video mixer is controlled by a gain control input (not shown in FIG. 1) which specifies a parameter that identifies the relative weights associated with the current and previous video frames. The digital video mixer can be implemented by, for example, the digital video mixer available from Raytheon Semiconductor of La Jolla, Calif., as part number TMC22080.

Returning to FIG. 2, in steps 204 through 209, the values of each set of corresponding video data components from the current and previous video frames are blended to produce a processed value of that video data component for the current video frame. In step 204, the value of a video data component from the current video frame is determined. In the system 100 (FIG. 1), for example, this value would be represented by one of the input signals 111, 112, 113.

In step 205, the value of the corresponding video data component from the previous video frame is ascertained. In the system 100, for example, this would occur by retrieving the appropriate value from the memory 104.

In step 206, a weighted average of the values of the video data component from the current and previous video frames is calculated. The magnitude of the video data component from each of the current and previous video frames is multiplied by the respective associated weight, determined as discussed above with respect to step 203, and the results are added together. In the system 100, for example, this step is carried out by the gain devices 102 and 105 and the adder 103.

When the method 200 begins, the value of each of the video data components from the previous video frame is unknown and generally does not correspond to the image that it is desired to display. This would seem to cause an "error", since the first blending of corresponding video data components from a previous and current video frame would produce video data components for the processed video image having unknown magnitude (and, in particular, a magnitude that may not closely correspond to the image to be displayed). Thus, initially, the processed video image could be significantly distorted. However, in practice, such distortion does not last long because, generally, the blending of values of corresponding video data components from the current and previous video frames that is accomplished by steps 204 through 209 occurs at a frequency that is much greater than the frame rate. For example, the blending of all video data components from the current and previous frames can occur 30 times per second. The frame rate, on the other hand, is typically approximately 5 frames per second. Using these exemplary numbers, the blending of video data components from current and previous video frames occurs six times after each new frame of video data is input to the frame averaging method 200, each successive blending further reducing any "error" that may have been present. Further, the blending can be done, for example, using 6-bit adders so that any "error" resulting from blending of the video data components of the first current frame of video data with the unknown video data components of the previous video "frame" is essentially eliminated (for 50%-50% weighting of the current and previous video frames) within 6/n seconds (where n represents the display refresh rate, as discussed above.)

In step 207, the weighted average calculated in step 206 is both used as the value of the video data component with which to generate the current processed video frame and stored as the value of the video data component of the previous video frame to be used in calculation of the video data component for the next current processed video frame. In the system 100, for example, use of the weighted average to generate the current processed video frame occurs after the weighted average is output from the demultiplexer 106, while storage of the weighted average occurs by storing the value of the video data component in the appropriate location of the memory 104.

Once the video data component for the current processed video frame is calculated, the steps 204 through 207 must be performed again for all subsequent video components. In step 208, a determination is made as to whether any additional video data components of the current video frame remain to be processed. If yes, then, as indicated, steps 204 through 207 are performed to calculate the value of a new video data component.

Once the value of all video data components for the current processed video frame have been calculated (the answer to the question of step 208 is no), then the value of the video data components for a subsequent video frame, if any, must be calculated. In step 209, a determination is made as to whether any additional video frames are to be processed. If yes, then, steps 204 through 208 are performed to calculate the values of the video data components of the new current processed video frame. If no, then, as indicated by 210, the method 200 terminates.

As indicated above, the weighting of the current and previous video frames can be varied and, in particular, can be varied according to the magnitude of the frame rate. The capacity to vary the weighting is advantageous in that, as indicated above, the weighting can be varied to increase the amount of smearing between video frames as the frame rate decreases. This enables only that amount of smearing to be produced that is necessary, so that the processed video data can be maintained as close as possible to the unprocessed video data while still achieving an acceptable video image through the use of smearing.

As indicated above, the system 100 of FIG. 1 can be implemented as part of a video data capture part or a video data display part of a video system. The same is true of the method 200 of FIG. 2. Either the system 100 or the method 200 can be implemented in one or the other or both of a video data capture part and a video data display part of a video system.

FIG. 4 is a block diagram of a system 400 according to the invention for obtaining and displaying video data. The system 400 transforms a set of unprocessed video data 411 into a displayed image 423. The system 400 includes a video data capture part 410 and a video data display part 420. The video data capture part 410 includes unprocessed video data 411, a frame averager 412 and a video data compressor 413, while the video data display part 420 includes a video data decompressor 421, a frame averager 422 and a displayed image 423.

The unprocessed video data 411 can be pre-existing (e.g., stored in a memory) or can be obtained by the system 400 using conventional video data acquisition techniques and equipment (e.g., obtained by a video camera). The unprocessed video data 411 can be either analog or digital. If the unprocessed video data 411 is analog, usually the unprocessed video data 411 is converted to digital data, though, strictly speaking, this need not necessarily be done. Further, the video data can be either monochrome or color.

The unprocessed video data 411 is transferred to the frame averager 412. The frame averager 412 operates generally according to the principles of the invention described above. The frame averager 412 can, but need not necessarily, be embodied by the system 100 (FIG. 1) and can, but need not necessarily, implement the method 200 (FIG. 2).

The averaged data produced by the frame averager 412 is then transferred to the video data compressor 413. The video data compressor 413 can be embodied by any conventional data compression apparatus that accepts video data represented in the manner that the video data is output by the frame averager 412. The data compression is useful in increasing the effective frame rate at which data is transferred over the communication line 430.

The compressed data output from the video data compressor 413 is transferred over the communication line 430 to a video data decompressor 421. The video data decompressor 421 can be embodied by any conventional data decompression apparatus that accepts video data represented in the manner that the video data is output by the video data, compressor 413.

The decompressed data is transferred to the frame averager 422. Like the frame averager 412, the frame averager 422 operates generally according to the principles of the invention described above, and can be embodied by, for example, the system 100 (FIG. 1) and can implement, for example, the method 200 (FIG. 2).

The averaged data produced by the frame averager 422 is then transferred to a display device to produce the displayed image 423. Any appropriate display device can be used. The display device can be, for example, a computer display monitor or a television screen.

Though the system 400 shown in FIG. 4 includes a video data compressor 413 in the video data capture part 410 and a video data decompressor 423 in the video data display part 420, the compressor 413 and 423 need not necessarily be present. The important aspect of the system 400 is the presence of a frame averager (the frame averager 412) in the video data capture part 410 and a frame averager (the frame averager 422) in the video data display part 420. As described in detail below, frame averaging provides particular benefits in each of the video data capture part 410 and video data display part 420. In particular, the use of frame averaging in the video data capture part of a video system including both a video data capture part and video data display part is an advantageous characteristic of the invention not found in the prior art.

Implementation of a frame averager in the video data capture part of a video system has several advantages. First, the frame averager reduces noise present in the input video data. This happens because, generally, there is no correlation in the noise present in a video data component from one frame of input video data to the next. Thus, noise that is present in a video data component in one frame may be followed by noise that is of opposite polarity in the next frame. Averaging corresponding video data components from successive frames of input video data causes, on average, a reduction in the noise content in any video data component after the averaging. Typically, the frame averaging results in an approximately 50% noise reduction overall. This reduction in noise directly improves the efficacy of the data compression, since spurious "data" (i.e., noise) that would otherwise have been compressed is eliminated by the frame averaging. Consequently, the effective rate at which data is transmitted over the communication line is increased, thereby increasing the effective frame rate and, thus, improving the quality of the displayed image.

Second, the frame averager produces a smearing effect, as discussed above, that improves the visual perception of low frame rate images. As a consequence of the averaging, each currently processed video frame includes content from the immediately previous frame (which can, in turn, include content from other previous frames), causing blurring, as the display changes from frame to frame, in portions of the image that include motion. The blurring provides a strong visual cue that makes motion in low frame rate video tolerable to a viewer. Without the smearing, motion in the image would appear to the viewer as jerky and choppy.

Third, the frame averaging causes the amount of change between data of successive processed frames to be reduced. Thus, the data for each processed frame can be compressed even more than would otherwise be the case, thereby increasing the effective frame rate of transmission of data over the communication line and, thus, improving the quality of the displayed image.

Implementation of a frame averager in the video data display part of a video system also has several advantages. First, in the same manner discussed in more detail above with respect to use of a frame averager in a video data capture part of a video system, the frame averager reduces noise in the decompressed data input to the frame averager. This is an important benefit, even where a frame averager in the video data capture part has reduced noise in the input video data, because a major artifact of decompressing data is the introduction of small random variations (noise) in the decompressed data. Use of a frame averager in the video data display part typically reduces this noise by approximately 50%, greatly improving the quality of the displayed image.

Second, as discussed above, the frame averager results in smearing that makes low frame rate video including motion more palatable to the viewer.

As previously indicated, the use of frame averaging according to the invention is beneficial for low frame rate video systems (i.e., systems having a frame rate less than approximately 24 frames per second). This is also true for a system similar to the system 400 including frame averaging in either a video data capture part or a video data display part. It is further believed that using frame averaging according to the invention in both the video data capture part and the video data display part produces noticeable benefits over the use of frame averaging according to the invention in only one of the video data capture part or video data display part when the frame rate is less than approximately 15 frames per second. However, such dual frame averaging can be used in video systems with higher frame rates.

Various embodiments of the invention have been described. The descriptions are intended to be illustrative, not limitative. Thus, it will be apparent to one skilled in the art that certain modifications may be made to the invention as described without departing from the scope of the claims set out below.

We claim:

1. A system for processing a plurality of sequentially occurring frames of time-varying video data in order to blend discontinuities in the images in the frames together, the video data including a plurality of sets of related video data components, the system comprising:

means for receiving successive sets of input signals in parallel and serially outputting the input signals of each set as current frame signals, each of the successive sets of input signals representing the magnitudes of a set of related video data components of a frame of unprocessed video data;

means for storing a plurality of values representing magnitudes of sets of related video data components for a previous frame of video data;

a current image content gain device for receiving each of the current frame signals output by the means for receiving and for outputting corresponding amplified current frame signals;

a prior image content gain device for receiving previous frame signals representing the magnitudes of the video data components for the previous frame of video data, the previous frame signals being generated from the values in a memory, and for outputting corresponding amplified previous frame signals, the current and prior image content gain devices being controlled so that the amplified current frame signals and amplified previous frame signals for corresponding video data components are output at the same time;

a blender for receiving corresponding amplified current frame signals and amplified previous frame signals and for outputting output signals representing the sum of the corresponding amplified current frame signals and amplified previous frame signals to blend discontinuities in the current frame signals and the previous frame signals together, the output signals being used to update the values in the memory for the corresponding video data components of the previous frame of video data; and means for receiving the output signals serially from the adder and outputting in parallel sets of output signals corresponding to sets of input signals, each set of output signals representing the magnitudes of a set of related video data components of a current frame of processed video data.

2. A system as in claim 1, wherein the means for receiving and serially outputting, the current image content gain device, the prior image content gain device, the adder, and the means for receiving serially and outputting in parallel are each implemented in a field programmable gate array.

3. A system as in claim 1, wherein the frame rate is less than or equal to approximately 24 frames per second.

4. A system as in claim 1, wherein:
the means for receiving and serially outputting is a multiplexer; and
the means for receiving serially and outputting in parallel is a demultiplexer.

5. A system for processing a plurality of sequentially occurring frames of time-varying video data to blend discontinuities in the sequentially occurring frames together, the video data including a plurality of video data components, the system comprising:
means for acquiring a plurality of frames of input video data at a frame rate of less than or equal to approximately 24 frames per second;
a frame blending device for generating a plurality of signals representing weighted averages of the values of corresponding video data components from a currently acquired frame of input video data and a previous frame of input video data in order to blend discontinuities between the currently acquired frame of input video data and the previous frame of input video data together;
means for transmitting the signals to a system for displaying the video image;
means for receiving the signals transmitted by the means for transmitting;
a second frame averaging device for generating a second plurality of signals representing weighted averages of the values of corresponding video data components from a previously displayed frame of video data and a current frame of video data represented by the signals received by the means for receiving; and
a display device for displaying output video data, the output video data being represented by the second plurality of signals.

6. A system as in claim 5, further comprising a video data compressor for compressing the plurality of signals before the signals are transmitted by the means for transmitting.

7. A system as in claim 6, further comprising:
means for receiving the compressed signals transmitted by the means for transmitting;
a video data decompressor for decompressing the compressed signals;
a second frame averaging device for generating a second plurality of signals representing weighted averages of the values of corresponding video data components from a previously displayed frame of video data and a current frame of video data represented by the decompressed signals; and
a display device for displaying output video data, the output video data being represented by the second plurality of signals.

8. A system for processing a plurality of sequentially occurring frames of time-varying video data to blend discontinuities in the sequentially occurring frames together, comprising:
means for acquiring a current frame signal representing the value of a video data component from a current frame of unprocessed video data;
means for generating a previous frame signal representing the value of a video data component from a previous frame of video data that corresponds to the video data component from the current frame of unprocessed video data;
frame blending means for receiving the current frame signal and the previous frame signal, and outputting an output signal representing processed video data for the current frame, the output signal representing a weighted average of the values of the corresponding video data components from the current frame of unprocessed video data and the previous frame of video data to blend discontinuities between the current frame of unprocessed video data and the previous frame of video data together;
means for varying the weights associated with the current frame of unprocessed video data and the previous frame of video data, operably coupled to the frame averaging means, to enable variation of the relative degree of influence on the output signal of the video data components from the current frame of unprocessed video data and the previous frame of video data; and
wherein the frame averaging means and means for varying further comprise a mixture selector for receiving the current video signal, the previous video signal and a frame weight selection signal, and outputting a first intermediate signal, the frame weight selection signal representing a particular set of weights associated with the current frame of unprocessed video data and the previous frame of video data, the first intermediate signal being equivalent to either the current or previous video signal according to the set of weights represented by the frame weight selection signal, a first adder for receiving the current video signal and the first intermediate signal, and outputting a second intermediate signal that is the sum of the current video signal and the first intermediate signal, and a second adder for receiving the second intermediate signal and the previous video signal, and outputting the sum of the second intermediate signal and the previous video signal as the weighted average signal.

9. A system as in claim 8, wherein the frame averaging means and means for varying further comprise a digital video mixer.

10. A system as in claim 8, wherein the weights associated with the current frame of unprocessed video data and previous frame of video data are dependent upon the magnitude of the frame rate.

11. A system as in claim 8, further comprising means for determining the frame rate of the video data.

12. A system as in claim 8, wherein:
for frame rates less than or equal to approximately five frames per second, the means for varying associates a weight of 0.75 with the previous frame of video data and a weight of 0.25 with the current frame of unprocessed video data; and
for frame rates greater than approximately five frames per second and less than or equal to approximately 24 frames per second, the means for varying associates a weight of 0.5 with the previous frame of video data and a weight of 0.5 with the current frame of unprocessed video data.

13. A method for processing a plurality of sequentially occurring frames of time-varying video data to blend discontinuities in the sequentially occurring frames together, comprising the steps of:
determining the value of a video data component from a current frame of unprocessed video data;
determining the value of a corresponding video data component from a previous frame of video data;
forming a weighted average of the values of the corresponding video data components from the current frame of unprocessed video data and the previous frame of video data to blend discontinuities between the current frame of unprocessed video data and the previous frame of video data together, wherein the weights associated with the current frame of unprocessed video data and previous frame of video data can be varied according to a predefined instruction to enable variation of the relative degree of influence on the weighted average of the video data components from the current frame of unprocessed video data and the previous frame of video data; and wherein the step of forming further comprises inputting the value of the video data component from the current frame of unprocessed video data, inputting the value of the video data component from the previous frame of video data, inputting a frame weight selection representing a particular set of weights associated with the current frame of unprocessed video data and the previous frame of video data, selecting either the value of the video data component from the current frame of unprocessed video data or the value of the video data component from the previous frame of video data, depending upon the frame weight selection, as a value of a first intermediate weighted data component, adding the value of the video data component from the current frame of unprocessed video data to the value of the first intermediate weighted data component to produce a value of a second intermediate weighted data component, and adding the value of the second intermediate weighted data component and the value of the video data component from the previous frame of video data to produce the weighted average.

14. A method as in claim 13, wherein the weights associated with the current frame of unprocessed video data and the previous frame of video data are dependent upon the magnitude of the frame rate.

15. A method as in claim 14, further comprising the step of determining the frame rate of the video data.

16. A method as in claim 14, wherein the step of inputting a frame weight selection further comprises the steps of:

for frame rates less than or equal to approximately five frames per second, associating a weight of 0.75 with the previous frame of video data and a weight of 0.25 with the current frame of unprocessed video data; and for frame rates greater than approximately five frames per second and less than or equal to approximately 24 frames per second, associating a weight of 0.5 with the previous frame of video data and a weight of 0.5 with the current frame of unprocessed video data.

17. A system for processing a plurality of sequentially occurring frames of time-varying video data in order to blend discontinuities in the images in the frames together, the video data including a plurality of sets of related video data components, the system comprising:

a multiplexer that receives successive sets of input signals in parallel and serially outputs the input signals of each set as current frame signals, each of the successive sets of input signals representing the magnitudes of a set of related video data components of a frame of unprocessed video data;

means for storing a plurality of values representing magnitudes of sets of related video data components for a previous frame of video data;

a current image content gain device for receiving each of the current frame signals output by the means for receiving and for outputting corresponding amplified current frame signals;

a prior image content gain device for receiving previous frame signals representing the magnitudes of the video data components for the previous frame of video data, the previous frame signals being generated from the values in a memory, and for outputting corresponding amplified previous frame signals, the current and prior image content gain devices being controlled so that the amplified current frame signals and amplified previous frame signals for corresponding video data components are output at the same time;

an adder for receiving corresponding amplified current frame signals and amplified previous frame signals and for outputting output signals representing the sum of the corresponding amplified current frame signals and amplified previous frame signals to blend discontinuities in the current frame signals and the previous frame signals together, the output signals being used to update the values in the memory for the corresponding video data components of the previous frame of video data; and a demultiplexer that receives the output signals serially from the adder and outputs in parallel sets of output signals corresponding to sets of input signals, each set of output signals representing the magnitudes of a set of related video data components of a current frame of processed video data.

* * * * *